No. 826,532. PATENTED JULY 24, 1906.
R. E. BRISTOW.
FLUSH TANK VALVE MECHANISM.
APPLICATION FILED APR. 27, 1905.
2 SHEETS—SHEET 1.
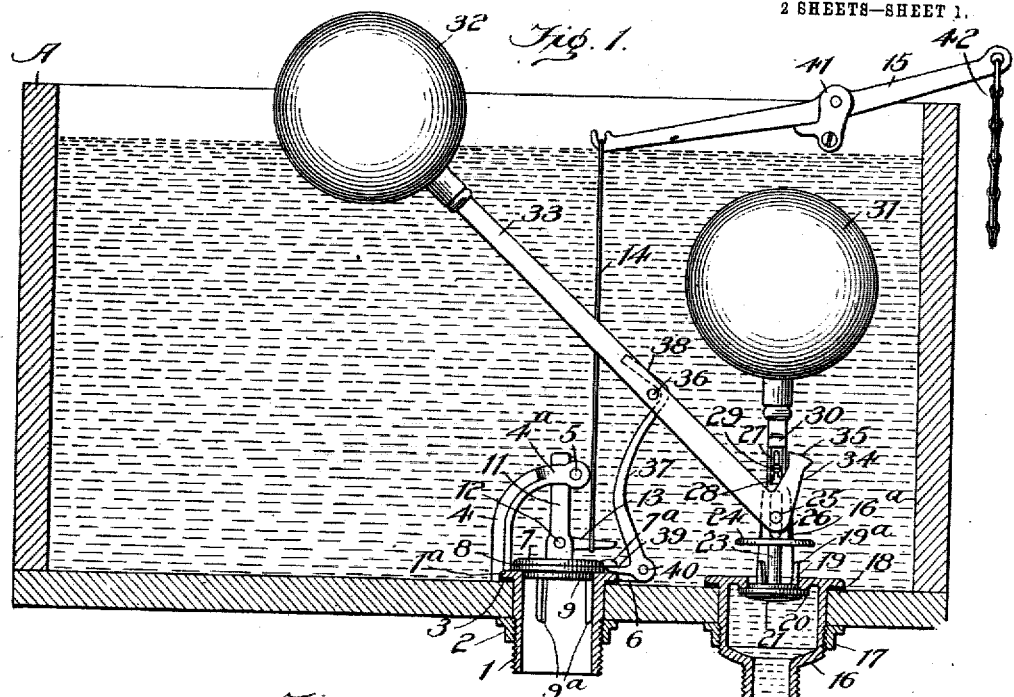
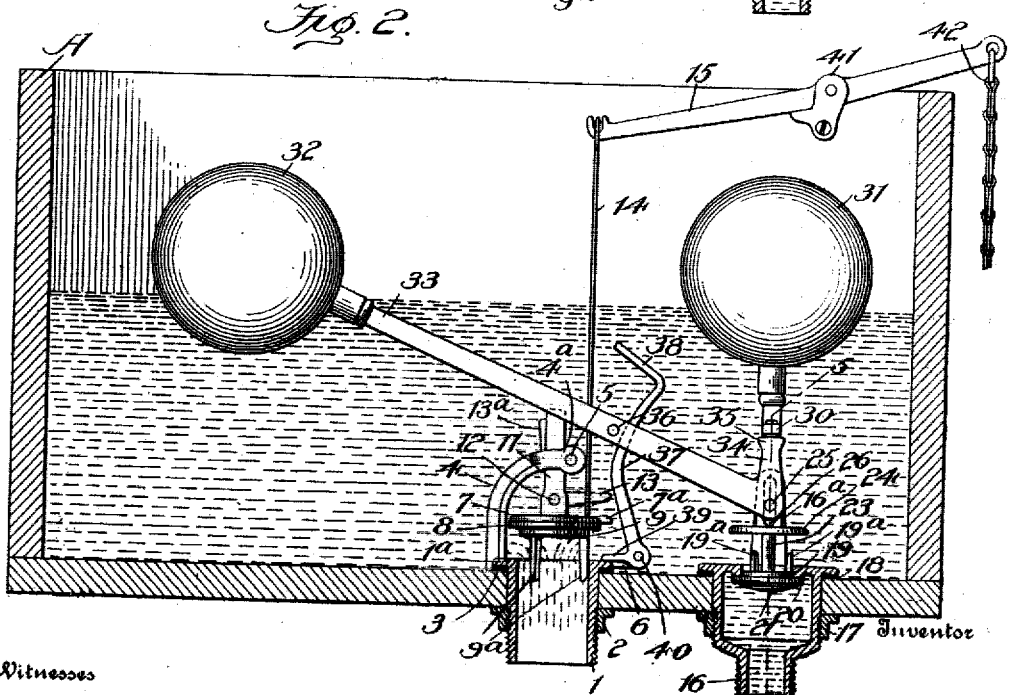
Witnesses
Edwin L. Bradford
Inventor
Ralph E. Bristow
F. N. Ritter, Jr.
Attorney No. 826,532. PATENTED JULY 24, 1906.
R. E. BRISTOW.
FLUSH TANK VALVE MECHANISM.
APPLICATION FILED APR. 27, 1905.
2 SHEETS—SHEET 2.
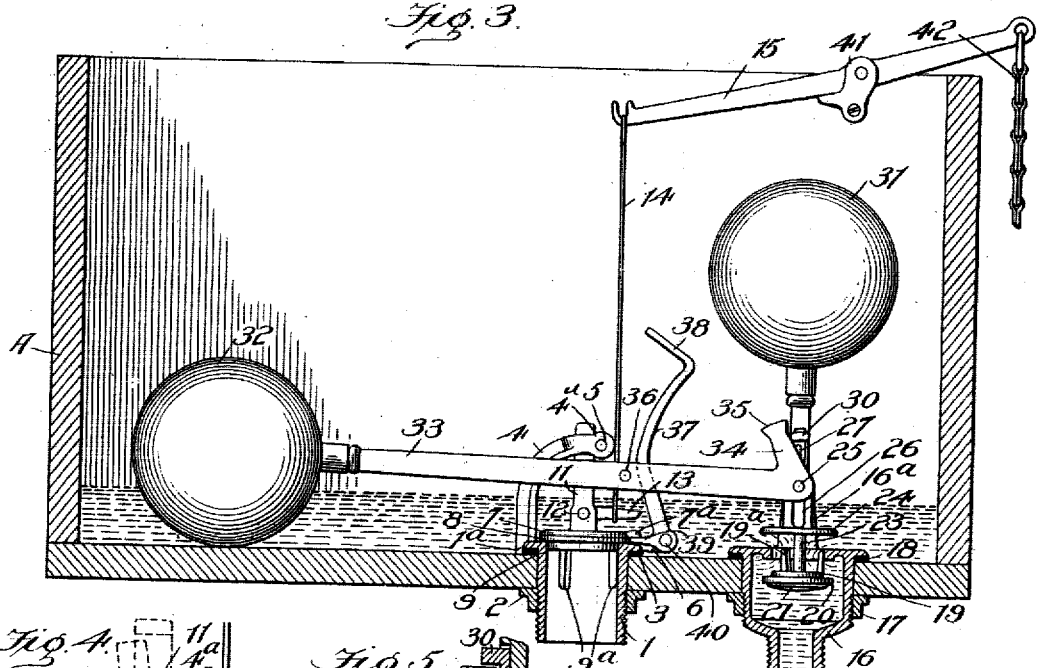
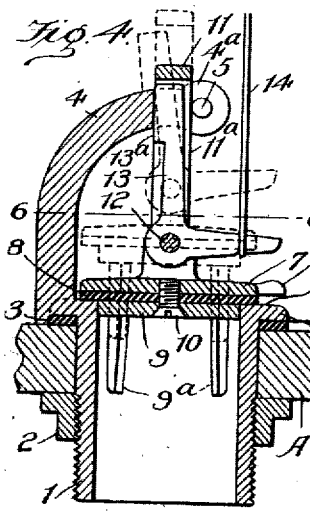
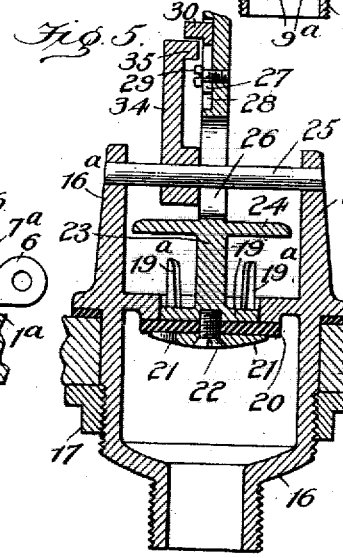
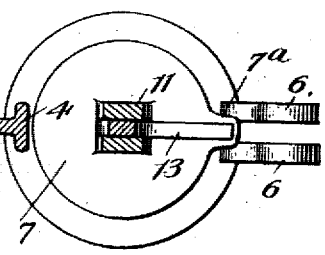
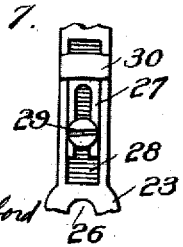
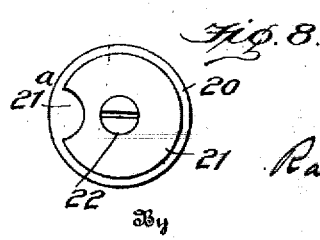
Witnesses
Edwin L. Bradford
G. P. Ritter
Inventor
Ralph E. Bristow
By F. W. Ritter, Jr.
Attorney

UNITED STATES PATENT OFFICE.

RALPH E. BRISTOW, OF DENVER, COLORADO.

FLUSH-TANK VALVE MECHANISM.

No. 826,532.　　　　Specification of Letters Patent.　　　Patented July 24, 1906.

Application filed April 27, 1905. Serial No. 257,639.

*To all whom it may concern:*

Be it known that I, RALPH E. BRISTOW, a citizen of the United States, residing at Denver, in the county of Denver and State of Colorado, have invented certain new and useful Improvements in Flush-Tank Valve Mechanism; and I do hereby declare the following to be a full, clear, and exact description of the invention, such as will enable others skilled in the art to which it appertains to make and use the same.

My invention relates to the construction of valve mechanism for the control of the inlet and outlet valves of flush-tanks or similar devices wherein the influx and efflux of the water or other fluid is desired to be regulated and controlled in predetermined sequence, and has for its object to provide efficient means whereby the noise due to the operation of the device is minimized, the maximum efficiency of the flushing operation is obtained without waste of water, and the valves are so actuated and controlled that wear is greatly decreased.

To this end my invention, generally stated, may be said to reside in a construction wherein the inlet-valve is locked in a closed position while the outlet-valve is locked in an open position and wherein the inlet-valve is opened simultaneously with the closure of the outlet-valve and is locked in such open position until the desired amount of water has been admitted, when it is immediately and fully closed.

There are other minor features of invention residing in particular combinations and elemental construction, all as will hereinafter more fully appear.

In the drawings chosen for the purpose of illustrating my invention, the scope whereof is pointed out in the claims, Figure 1 is a vertical section of a tank, to which my valve-controlled mechanism is applied, such controlling mechanism being shown partly in section and partly in elevation in the relative position the parts occupy when the tank is full of water and both valves are closed. Fig. 2 is a view taken in the same plane as Fig. 1, but showing the outlet-valve locked in an open position while the inlet-valve is locked in a closed position. Fig. 3 is a view taken in the same plane as Figs. 1 and 2, but showing the relative positions of the several parts of the structure at the instant the outlet-valve has closed and the inlet-valve has opened. Fig. 4 is an enlarged detail view, partly in elevation and partly in vertical section, showing the outlet-valve and its locking mechanism, the valve being shown closed in full lines and open in dotted lines. Fig. 5 is an enlarged detail section of the inlet-valve, taken on the line 5 5, Fig. 2. Fig. 6 is a horizontal section on the line 6 6, Fig. 4. Fig. 7 is an enlarged detail view showing a portion of the inlet-valve stem, and the adjustable slide member whereby the extent of opening of the inlet-valve is governed and the said outlet-valve is locked by coöperation with the master or controlling float. Fig. 8 is an inverted plan view of the washer by which the gasket of the inlet-valve is secured in position.

Like symbols refer to like parts wherever they occur.

I will now proceed to describe my invention more fully, so that others skilled in the art to which it appertains may apply the same.

In the drawings, A is a tank having a suitable outlet-valve seat 1, secured in an opening therein by a threaded nut 2, the upper portion of said valve-seat within the tank A being provided with an annular flange 1ª, between which and the tank a gasket, such as 3, is interposed to form a tight joint. Preferably formed integral with said outlet-valve seat 1 is an upwardly-extending bracket 4, which forms a keeper for the outlet-valve latch, as will hereinafter appear, and which, by its bifurcated upper end 4ª, forms a guide for the stem of the outlet-valve, the latter being maintained within the fork 4ª by suitable means, as the pin 5. For the purpose of forming a simple and convenient fulcrum for the overflow-lever which actuates the outlet-valve when the water in the tank rises above the normal level said outlet-valve seat 1 is also preferably formed with integral perforated lugs 6 6, extending laterally outward from the annular flange 1ª thereof.

The outlet-valve 7 may be of any suitable construction, such as a valve-body portion having a rubber gasket 8 secured to the under side thereof by a washer 9 and a screw 10, said washer 9 being preferably provided with a plurality of downwardly-extending peripherally-arranged guide lugs, prongs, or fingers 9ª, by means of which said outlet-valve is guided and maintained centrally of its valve-seat. The body portion of said outlet-valve 7 is also preferably formed with a lug 7ª, extending laterally from the periphery thereof to engage one arm of the overflow-lever in a manner and for a purpose which will hereinafter appear.

The stem 11 of the outlet-valve may be formed with a vertically-extending slot 11ª, which forms both a housing and a guide for the outlet-valve latch or lock 13, the latter being secured in position to have a pivotal or vibratory motion, as by a pin 12, which passes through perforations in the valve-stem 11.

The outlet-valve latch 13, which is movable bodily with the outlet-valve as well as pivotally with respect thereto, is preferably in the form of a bell-crank lever having one of its arms housed within the vertically-extending slot of the valve-stem, the other arm thereof extending laterally outward to engage suitable means, such as a rod 14, for transmitting the movement of the operating-lever 15 to the said lock or latch 13 and the outlet-valve 7 and to afford means for releasing the said latch by the action of the master-float, as will hereinafter appear.

Preferably at the upper end of that arm of the latch 13 which is housed within the valve-stem is formed the locking head or lug 13ª, said lug or head having its under side curved or inclined downwardly to correspond with the similarly curved or inclined portion of the bracket 4, with which it engages when the outlet-valve 7 is locked in open position. Said arm of the latch 13 is also preferably of such length that it is maintained within the bifurcated ends 4ª of the bracket when the said outlet-valve is closed, the latch by this means being guided and constrained to move in its proper path in a very simple manner.

The inlet-valve seat 16 may be secured in an opening in the tank A in a manner similar to the outlet-valve seat 1 by means of a threaded nut 17, that portion of the valve-seat within the tank being provided with a peripheral flange, between which and the floor of the tank is interposed a gasket, such as 18. Extending upwardly upon opposite sides of the opening in the inlet-valve seat or fitting 16 and preferably cast integral therewith are the lugs or brackets 16ª 16ª, said lugs being perforated to receive a member, as the pin 25, which passes through a slot 26 in the inlet-valve stem 23 and serves to maintain said valve in proper position and to limit the extent of opening thereof.

The inlet-valve may be comprised of a body portion, such as 19, having a plurality of guide-lugs 19ª extending upwardly from the periphery thereof to maintain the valve in proper relation with its seat, a rubber gasket 20 being affixed to said body portion by means of a washer 21 and a screw 22. The washer 21 is so formed as to permit the introduction of the valve within the valve-seat casting, as by forming in the edge thereof a recess or indentation 21ª. The stem 23 of the inlet-valve is preferably cast with an annular disk 24, located above the guide-lugs 19ª and extending laterally over the valve-seat opening to serve as a deflector for the inflowing water when said valve is open, thus preventing noise due to this cause. Above the deflector 24 the valve-stem 23 is preferably provided with means, such as a slot 26, adapted to coact with a guide member, such as the pin 25, to thereby maintain the valve in proper alinement during its operation and to govern the extent of opening of said inlet-valve. Preferably mounted on a slide 27, which is movable in a groove 28 of the inlet-valve stem 23 and which is adapted to be fixed with respect to said valve-stem by means of the screw 29, is the inlet-valve locking-lug 30, said lug having its upper and under faces substantially concentrically curved to correspond with the faces of the coacting latching member 35, operated by the master-float. To the upper end of the inlet-valve stem 23 is secured the inlet-valve float 31, said float being preferably arranged to be completely submerged when the inlet-valve is closed in order to increase the buoyant force acting thereon, and thereby cause a rapid and positive closure of said valve. By this means also, it will be observed, any leakage of the inlet-valve itself increases the buoyancy of the inlet-valve float, and thus acts to more tightly close the valve.

Pivoted upon the pin 25, which, it will be noted, is the common means to guide and limit the movement of the inlet-valve, is the master-float 32, the stem 33 whereof is provided with an arm 34, extending radially from the pivot-pin 25 and carrying thereon a lug or projection 35, which is adapted to coact with the locking-lug 30 of the inlet-valve to control the operation of said valve, said lug 35 having its upper and under faces suitably formed to coöperate with the proper faces of the said locking-lug 30.

The stem 33 of the master-float 32 is provided with suitable means, as a lug or pin 36, for engaging the laterally-extending arm of the outlet-valve latch 13 to trip or release the latter when the master-float has assumed a lowered position, the outlet-valve being thus permitted to close. Such lug or pin 36 is also preferably utilized as a means of operating the overflow-lever 37, the latter for this purpose having a portion 38, which is adapted to lie above and extend transversely across the path of travel of said lug 36 when said parts are in contact.

The overflow-lever 37 may be pivoted to the lugs 6 6 of the outlet-valve-seat casting 1 by a pin 40, such overflow-lever having an arm or portion 39, adapted to lie beneath the lug 7ª of the outlet-valve and to coöperate therewith to open said outlet-valve whenever the water in the tank rises above its normal level.

The operating-lever 15, which may be pivotally attached to the tank A by a bracket-casting 41, has attached to it at one end a chain 42 or the like and at the other end a rod 14, the latter being connected to the laterally-extending arm of the outlet-valve latch 13 at a point eccentric of its pivot.

The construction being substantially such as hereinbefore pointed out, the operation of the device will be as follows: Assuming the tank to be filled and both valves closed, as shown in Fig. 1, a downward pull upon the chain 42 will actuate the operating-lever 15, which, acting through the rod 14, connected thereto, causes the outlet-valve 7 to assume an open position, the latter being locked in such open position by the engagement of the locking-head 13$^a$ of the latch 13 with a portion of the bracket 4 of the outlet-valve seat or fitting 1, said latch 13 being caused to assume such locking position by reason of the eccentric pull of the rod 14 thereon. As now the water-level in the tank lowers and before it has reached a point which would uncover the inlet-valve float 31 sufficiently to permit the inlet-valve to open were it free to do so the fall of the master-float 32 causes the lug or projection 35, carried by the arm 34 of the float-stem 33, to engage the locking-lug 30 of the inlet-valve, (see Fig. 2,) thus positively locking the inlet-valve closed. When the water-level in the tank has fallen to its lowest desired level, which is preferably at such a point that the outlet-valve is still submerged, the trip lug or pin 36, carried by the stem 33 of the master-float 32, engages the laterally-extending arm of the latch 13 and unlocks the outlet-valve, which instantly closes. At this instant the lug 35, movable with the master-float, is disengaged from the locking-lug 30 of the inlet-valve, permitting the latter to open, as shown in Fig. 3. As the water now flows into the tank through the inlet-valve the master-float 32 is raised and the lug 35 thereby moved into position to engage the upper side of the inlet-valve-locking lug 30, such lugs 30 and 35 remaining in engagement and locking the inlet-valve open until such time as the master-float has returned to its normal position, at which instant the said lugs are disengaged and the buoyancy of the submerged inlet-valve float 31 causes the immediate and complete closure of the said inlet-valve. If from any cause the water in the tank rises above its normal level, the pin or projection 36 of the master-float stem 33 engages the portion 38 of the overflow-lever 37, causing the latter to move slightly upon its pivot and the arm 39 thereof to open the outlet-valve by engagement with the lug 7$^a$ of the said valve.

Having thus described my invention, what I claim, and desire to secure by Letters Patent, is—

1. In a mechanism of the character indicated, the combination with an outlet-valve, of a locking-latch pivoted thereon and movable therewith, a member with which said latch is adapted to engage to lock the valve in open position, and means for opening said valve, said opening means being connected to said latch at a point eccentric of its pivot whereby said latch is caused to positively move into engagement with said latch-engaging member when the valve is opened, and said valve being moved to an open position through the intermediacy of said latch.

2. In a mechanism of the character indicated, the combination with a valve having a slotted stem, of a locking-latch housed within said slotted stem, a valve-seat, and a bracket forming a guide for said valve and said locking-latch.

3. In a mechanism of the character indicated, the combination with an automatically-actuated valve, of a float, and a latching member movable by said float into two engaging positions with said valve, in one position of the engaging parts the valve being locked open and in the other position the valve being locked closed.

4. In a mechanism of the character indicated, the combination with a float, of an outlet-valve, and an overflow-lever adapted to engage said float and said valve to open the latter.

5. In a mechanism of the character indicated, the combination with a pivoted float, of a pivoted overflow-lever having an arm adapted to be actuated by said float and an arm adapted to engage said valve to open the same.

6. In a mechanism of the character indicated, the combination with a master-float, of an inlet-valve having a locking-lug on the stem thereof and provided with a float, of an outlet-valve having a locking-latch pivoted thereon, means operative by the master-float for releasing said locking-latch, and means also operative by said master-float for restraining the movement of said inlet-valve.

7. In a mechanism of the character indicated, the combination with a valve, of a lock for said valve, an overflow-lever, and means adapted to independently actuate both said lock and said overflow-lever.

8. In a mechanism of the character indicated, the combination with an inlet-valve, of an outlet-valve having a locking-latch pivoted thereon and bodily movable therewith, a valve-operating member adapted to positively actuate said latch, and a stationary member engaged by said locking-latch.

9. In a mechanism of the character indicated, the combination with an outlet-valve, of a locking-latch pivoted thereon, means for opening said valve through said latch, a stationary member adapted to be engaged by said locking-latch, and devices independent of said latch and said stationary member for releasing said latch.

10. In a mechanism of the character indicated, the combination with a master-float having a locking-arm attached thereto, of a valve, means for opening and closing said valve, and a locking member carried by said valve in position to be engaged by said locking-arm in both open and closed positions of the valve.

11. In a mechanism of the character indicated, the combination with a vertically-movable outlet-valve, of a suitable guide for said valve, a lever pivoted on said valve, one arm of said lever constituting a latch, a member with which the latch-arm of the lever is adapted to engage to lock the valve in open position, and means for actuating the latch through the intermediacy of the other arm of said lever.

In testimony whereof I affix my signature in presence of two subscribing witnesses.

RALPH E. BRISTOW.

Witnesses:
  LOUISE BRISTOW,
  P. S. HODGKINS.